(12) United States Patent
Minematsu

(10) Patent No.: US 8,891,758 B2
(45) Date of Patent: Nov. 18, 2014

(54) BLOCK ENCRYPTION DEVICE AND METHOD AND COMPUTER PROGRAM

(75) Inventor: Kazuhiko Minematsu, Tokyo (JP)

(73) Assignee: NEC Corporation, Tokyo (JP)

(*) Notice: Subject to any disclaimer, the term of this patent is extended or adjusted under 35 U.S.C. 154(b) by 218 days.

(21) Appl. No.: 13/504,389

(22) PCT Filed: Oct. 26, 2010

(86) PCT No.: PCT/JP2010/068965
§ 371 (c)(1),
(2), (4) Date: Jul. 11, 2012

(87) PCT Pub. No.: WO2011/052587
PCT Pub. Date: May 5, 2011

(65) Prior Publication Data
US 2012/0269342 A1 Oct. 25, 2012

(30) Foreign Application Priority Data
Oct. 27, 2009 (JP) ................. 2009-246307

(51) Int. Cl.
*G06F 21/00* (2013.01)
*H04L 9/06* (2006.01)
(52) U.S. Cl.
CPC .................... *H04L 9/0625* (2013.01)
USPC ........................................................ 380/28
(58) Field of Classification Search
CPC .... H04L 9/0618; H04L 9/0625; H04L 9/0631
See application file for complete search history.

(56) References Cited

U.S. PATENT DOCUMENTS

| | | | |
|---|---|---|---|
| 4,168,396 | A | 9/1979 | Best |
| 4,275,265 | A | 6/1981 | Davida et al. |
| 6,201,869 | B1 | 3/2001 | Matsui et al. |
| 6,578,061 | B1 | 6/2003 | Aoki et al. |
| 2006/0236102 | A1 | 10/2006 | Golic |
| 2010/0014659 | A1 | 1/2010 | Shibutani et al. |
| 2010/0091991 | A1 | 4/2010 | Shibutani et al. |
| 2011/0110519 | A1* | 5/2011 | Suzaki et al. ............ 380/255 |

FOREIGN PATENT DOCUMENTS

| | | |
|---|---|---|
| CN | 101512620 A | 8/2009 |
| CN | 101553856 A | 10/2009 |
| JP | 06118872 A | 4/1994 |
| JP | 6-342258 A | 12/1994 |
| JP | 1152850 A | 2/1999 |
| JP | 11105853 A | 4/1999 |
| JP | 11-242433 A | 9/1999 |

(Continued)

OTHER PUBLICATIONS

A. Biryukov and C. De Canniere, "Data Encryption Standard," Encyclopedia of Cryptology and Security, pp. 129-134, 2005.*

(Continued)

*Primary Examiner* — Michael R Vaughan
(74) *Attorney, Agent, or Firm* — Sughrue Mion, PLLC

(57) ABSTRACT

In block cipher based on generalized Feistel network, pseudorandomness and strong-pseudorandomness may be fulfilled efficiently. In encrypting a plaintext of kn-bit blocks, Feistel permutation is applied in terms of 2n bits as a unit, and then block-based permutation based on a binary de Bruijn graph with symmetrical type 2 branch coloring is applied. The Feistel permutation and the block-based permutation are grouped together to form a round. The round is repeatedly performed a preset number of times to output a ciphertext.

9 Claims, 11 Drawing Sheets

(56) References Cited

FOREIGN PATENT DOCUMENTS

| JP | 2000-214769 A | 8/2000 |
|---|---|---|
| WO | 9909705 A2 | 2/1999 |
| WO | 2008/026621 A1 | 3/2008 |
| WO | 2008/026623 A1 | 3/2008 |
| WO | 2008087972 A1 | 7/2008 |
| WO | 2009/034929 A1 | 3/2009 |
| WO | 2009/087972 A1 | 7/2009 |

OTHER PUBLICATIONS

Biryukov et al., "Cryptanalysis of Safter++", D. Boneh (Ed.): Crypto 2003, LNCS 2729, pp. 195-211, International Association for Cryptologic Research 2003.*

Suzaki et al., "Improving the Generalized Feistel", Lecture Notes in Computer Science (LNCS), Feb. 7 to 10, 2010, [Searched on Oct. 21, Heisei 25(2013)], Internet <URL: http://www.iacr.org/workshops/fse2010/_event_program.php>, FSE 2010, 32 pages, Seoul, Korea.

Office Action dated Oct. 29, 2013, issued by the Japan Patent Office in corresponding Japanese Application No. 2011-538431.

Zhu Shi-xin et al., "An Algorithm for Generating Feedback of $k$-ary De Bruijn Sequences by Raising Stage", Chinese Journal of Electronics, Jun. 2006, vol. 34, p. 1066 to 1068.

Office Action dated Feb. 24, 2014, issued by the State Intellectual Property Office of P.R.C. in corresponding Chinese Application No. 201080048501.7.

Tomoyasu Suzaki et al., "Improving the Generalized Feistel", FSE, Feb. 2010, pp. 19-39.

Toru Owada et al., "Hardware Implementation and Evaluation of Lesamnta", SCIS, Institute of Electronics, Information and Communication Engineers, Jan. 20-23, 2009, pp. 1-6.

James L. Massey, "On the Optimality of SAFER + Diffusion", Cylink Corporation, 1999, pp. 1-15.

Taizo Shirai et al., The 128-bit Blockcipher CLEFIA (Extended Abstract), Mar. 26-28, 2007.

Shiho Moriai et al., "On the Pseudorandomness of Top-Level Schemes of Block Ciphers", 3 pages, Asiacrypt, Dec. 3-7, 2000, LNCS 1976, pp. 289-302.

* cited by examiner

BLOCK ENCRYPTION DEVICE AND METHOD AND COMPUTER PROGRAM

CROSS REFERENCE TO RELATED APPLICATIONS

This application is a National Stage of International Application No. PCT/JP2010/068965 filed on Oct. 26, 2010, which claims priority from Japanese Patent Application No. 2009-246307, filed on Oct. 27, 2009, the contents of all of which are incorporated herein by reference in their entirety.

TECHNICAL FIELD

Related Application

This invention claims priority rights pertaining to the JP patent Application No. 2009-246307 filed on Oct. 27, 2009. The entire contents of this JP Patent Application of are to be incorporated by reference in the present Application.

This invention relates to a block encryption device, a block encryption method and a computer program. More particularly, it relates to a block encryption device and a block encryption method that rely upon Feistel permutation, and a computer program.

BACKGROUND

Block cipher is a sort of the common key cipher, and is a technique that encrypts a plaintext of a preset block size using a key. Representative of a method for configuring the block cipher is a system that uses Feistel permutation. The Feistel permutation divides a block into two unit blocks A, B, and delivers one A of the unit blocks to a non-linear function with a key. The non-linear function with a key is termed a round function. An output of the round function is Ex-ORed with the other unit block B, and the two unit blocks are then swapped and output. Specifically, (B, B+F(A)) is output in response to the round function F and the inputs (A, B). This processing is repeated a number of times corresponding to a preset number of rounds to generate a ciphertext.

There is also known a method that generalizes the Feistel permutation and that divides a block into two or more unit blocks to apply the Feistel permutation to the unit blocks in terms of two unit blocks as a set. This method is also termed a generalized Feistel network (GFN).

In GFN, each block is divided into a k-number of unit blocks, where k, an even number, is termed the number of division. If the unit block is composed of n-bits, a plaintext is composed of kn bits. If the k-number of unit blocks, obtained on dividing one block, are labeled (m[0], m[1], ..., m[k−1]), one round of GFN is BlockPerm (m[0], F(m[0])+m[1], m[2], F(m[2])+m[3], ..., F(m[k−2]), F(m[k−2])+m[k−1]). It is noted that F is a round function and BlockPerm is permutation that interchanges the positions of the k-number of unit blocks.

The BlockPerm that uses cyclic permutation is standard. That is, $$\text{BlockPerm}(v[0], v[1], \ldots, v[k-1]) = (v[1], v[2], \ldots, v[k-1], v[0])$$ [Equation 1] BlockPerm It is noted that, in List representation, in which output block numbers corresponding to the 0th input block down to the k−1st input block are arrayed, the BlockPerm may be expressed as $\{1, 2, \ldots, k-1, 0\}$.

An example of GFN that uses cyclic permutation with the number of division k=4 is shown in "CLEFIA" of Non-Patent Document 1. FIG. 10 herein shows the example of GFN that uses cyclic permutation with the number of division k=4.

In the techniques for evaluating structural safety of the block cipher, inclusive of GFN, there are pseudorandomness and strong-pseudorandomness.

In case the target block cipher is GFN with an R-number of rounds, with the number of division k and with the unit block composed of n bits, it is possible with pseudorandomness and strong-pseudorandomness to evaluate whether or not, in case the RK/2-number of the round functions are all regarded to be independent pseudo-random functions, the block cipher in its entirety may become pseudorandom and strong-pseudorandom permutations of kn bits.

The pseudorandom function F is a function that outputs a pseudorandom number F(x), a sequence difficult to distinguish from a true random number in light of the computational volume, from an arbitrary input x. The pseudorandom permutation E is permutation that outputs a pseudorandom number E(x) free of reiterations as ciphertext from an arbitrary plaintext x. The strong-pseudorandom permutation E is permutation that, once E has met the condition for pseudorandom permutation, outputs, even for inverse permutation D of E, a non-duplicate pseudorandom number D(y) as a plaintext from an arbitrary ciphertext y. The strong-pseudorandom permutation means block cipher with the strongest safety that may be currently expected in practice.

It is known from Non-Patent Document 2 that, if Block-Perm is cyclic permutation, for example, the GFN with k+1 rounds becomes pseudorandom permutation and the GFN with 2k rounds becomes strong-pseudorandom permutation. These evaluations provide a necessary minimum number of rounds in constructing practical block cipher. In light of safety and computational volume, such block cipher that satisfies pseudorandomness and strong-pseudorandomness with a smaller number of rounds is desirable. Hence, the number of rounds that satisfies pseudorandomness and strong-pseudorandomness is preferentially used as an index to evaluate the structural desirability or undesirability of the practical block cipher.

The round function, used in the practical block cipher, is generally more vulnerable than the pseudorandom function. Hence, the number of the rounds is selected to be larger than the minimum number of rounds necessary for pseudorandomness to provide for a certain margin for safety. Of course, if the pseudorandomness and strong-pseudorandomness are satisfied with a smaller number of rounds, the number of rounds necessary to secure a certain level of safety margin may be reduced, thus allowing for decreasing the global computational volume.

In a substitution-permutation network configuration (SPN configuration) block cipher, different from the Feistel configuration block cipher, processing termed Mix (S(m[0]), S(m[1]), ..., S(m[k−1])) is performed as one round. This processing is performed on a kn bit block input (m[0], m[1], ..., (m[k−1]) using non-linear permutation S with a key. It is noted that if Mix, which linearly transforms kn bits, permutes by interchanging n-bit blocks, different blocks do not affect one another. Hence, MIX is not safe under all situations. It is necessary for Mix to be a permutation including linear block-based operations.

In the 128-bit block cipher SAFER+, disclosed in "SAFER" of Non-Patent Document 3, Mix is implemented by combining 2-block based matrix operations, termed Pseudo-Hadamard Transform PHT, with Armenian shuffle, a permutation by block-based interchange, for k=16 and n=8.

[Non-Patent Document 1] Taizo Shirai, Kyoji Shibutani, Toru Akishita, Shiho Moriai, Tetsu Iwata: The 128-Bit Blockcipher CLEFIA. Alex Biryukov (Ed.): Fast Software Encryption, 14th International Workshop, FSE 2007, Luxembourg, Luxembourg, Mar. 26-28, 2007, Revised Selected Papers. Lecture Notes in Computer Science 4593 Springer 2007, pp. 181-195.

[Non-Patent Document 2] Shiho Moriai, Serge Vaudenay: On the Pseudorandomness of Top-Level Schemes of Block Ciphers. Tatsuaki Okamoto (Ed.): Advances in Cryptology—ASIACRYPT 2000, 6th International Conference on the Theory and Application of Cryptology and Information Security, Kyoto, Japan, Dec. 3-7, 2000, Proceedings. Lecture Notes in Computer Science 1976 Springer 2000, pp. 289-302.

[Non-Patent Document 3] James L. Massey: On the Optimality of SAFER+ Diffusion, Proceedings of the Second AES Candidate Conference, National Institute of Standards and Technology, 1999. (http://csrc.nist.gov/archive/aes/round1/conf2/papers/massey.pdf)

SUMMARY

The entirety of the contents disclosed in the Non-Patent Documents 1 to 3 are to be incorporated herein by reference. The following is an analysis of the related technique by the present invention.

It is stated in "SAFER" of Non-Patent Document 3 that, in connection with the Armenian shuffle, the following has been found by search based on a graph. Initially, the result of permutation of (m[0], m[1], ..., m[k−1]) by permutation BlockPerm is taken as (c[0], c[1], ..., c[k−1]). It is then contemplated to express this permutation BlockPerm by a graph of a k/2-number of nodes. With s=(k/2)−1, the nodes in the graph are labeled nodes=0, ..., s. A node i is to denote m[2i] and m[2i+1]. As stated in "SAFER" of Non-Patent Document 3, the BlockPerm may, in general, be uniquely expressed by a directed graph with indegree/outdegree of 2, that is, a directed graph in each node of which two branches make entrance and from each node of which two branches exit, with four-color coloring of the branches on the graph.

It is furthermore required of the BlockPerm that all even-numbered input blocks are replaced by odd-numbered output blocks and that all odd-numbered input blocks are replaced by even-numbered output blocks. That is, for given even numbers i, i' and for given odd numbers j, j', c[i]=m[j] and c[j']=m[i'].

To uniquely express an arbitrary BlockPerm that satisfies the above constraint, two colors are sufficient for use in the coloring pattern for the branches of the above directed graph. Specifically, the k/2 nodes are labeled 0, 1, ..., s, where s=(k/2)−1. Coloring is so made that, out of two branches exiting from each node, one is red (first color: represented by a fine line) and the other is blue (second color: represented by a thick line), and that, out of two branches entering each node, one is red and the other is blue. This coloring rule for branches is referred to below as 'type-2 branch coloring'.

Given a directed graph in which the above conditions are met, that is, in which the branches are colored in two colors as described above, the permutation BlockPerm may uniquely be determined. That is, the red branch from the node i to the node j is associated with the permutation of the block m[2i] by the block m[2j+1] and the blue branch from the node i' to the node j' is associated with the permutation of the block m[2i'+1] by the block m[2j']. Conversely, given the BlockPerm, the corresponding directed graph may uniquely be determined. Note that, in the "SAFER" of the Non-Patent Document 3, the directed graph, with the indegree/outdegree of 2, with branches not colored, is termed a skeleton.

The Armenian Shuffle of "SAFER" of Non-Patent Document 3 is a permutation obtained on slightly altering the order-3 binary de Bruijn graph B(3) as skeleton and coloring it by proper type-2 branch coloring.

Here, the de Bruijn graph B(d) is defined. The binary de Bruijn graph B(d), with the number of the symbols of 2 and with the order d, is a directed graph with the $2^d$-number of nodes. The indegree/outdegree is equal to the number of symbols and is 2. In this case, each node is expressed by a d-bit value (000, 001, ..., 111 if d=3). If the lower d−1 bit of a d-bit value x is LS(x) and connection of bit sequences is expressed by ∥, the two branches exiting the node x in the graph B(d) enter the nodes LS(x)∥0 and LS(x)∥1.

As a unique characteristic of the binary de Bruijn graph B(d), it is known that the diameter of the graph, that is, the maximum number of the branches necessary for transitioning between two arbitrary nodes, is d. This is a theoretically minimum value as the directed graph with the number of nodes $2^d$ and the degree 2.

The "SAFER" of Non-Patent Document 3 shows that, with the SPN configuration block cipher, linear transformation Mix may be realized by combining PHT and Armenian Shuffle, thus optimizing certain safety evaluation. It is because a diameter 3 of the skeleton of the Armenial Shuffle, a theoretically minimum value equal to the diameter of the order-3 binary de Bruijn graph B(3), may be attained.

If, in the block cipher with the number of division k, based on the generalized Feistel network, customary cyclic permutation is used for permutation of unit blocks, k+1 and 2k rounds are needed to satisfy pseudorandomness and strong-pseudorandomness, respectively, as stated above. There is thus a demand to reduce the number of rounds.

It is an object of the present invention to provide a device and a method for block encryption and a computer program, configured to reduce the number of the rounds needed for satisfying pseudorandomness and strong-pseudorandomness in the block cipher based on the generalized Feistel network.

In a first aspect, the present invention provides a block encryption device comprising: an input unit that divides input data into a k-number of block, a Feistel permutation unit for an R-number of rounds, a block permutation unit, and an output unit. The Feistel permutation unit performs Feistel permutation, with two blocks as a set, using an encryption key generated from one round to another. The block permutation unit performs block permutation equivalent to a binary de Bruijn graph with symmetric type 2 branch coloring, having a $2^t$-number, equal to one-half the number of division k, of nodes, where t>2. The de Bruijn graph indicates a transitioning from an even-numbered block to an odd-numbered block with an arrow line of a first color, while indicating a transitioning from an odd-numbered block to an even-numbered block with an arrow line of a second color, using the following functions:

colorfunc$(u,v)=v_t$ if $u_i=u_t$ colorfunc$(u,v)=v_t+1$ if $u_1 \ne u_t$

These functions decide on the colors of the arrow lines from a node u represented by a t-bit sequence $(u_1, u_2, \ldots, u_t)$ to a node v represented by another t-bit sequence $(v_1, v_2, \ldots, v_t)$. The output unit concatenates the as-permuted k-number of blocks to output the concatenated blocks.

In a second aspect, the present invention provides a block encryption method comprising: dividing input data into a k-number of blocks, and performing Feistel permutation for an R-number of rounds. The Feistel permutation performs Feistel permutation, with two blocks as a set, using an encryption key generated from one round to another. The block encryption method also includes block permutation performing block permutation equivalent to a binary de Bruijn graph with symmetric type 2 branch coloring, having a 2 t-number, equal to one-half the number of division k, of nodes, where t>2. The de Bruijn graph indicates a transitioning from an even-numbered block to an odd-numbered block with an arrow line of a first color and indicating a transitioning from an odd-numbered block to an even-numbered block with an arrow line of a second color, using the above mentioned functions that decide on the colors of the arrow lines from a node u represented by a t-bit sequence $(u_1, u_2, \ldots, u_t)$ to a node v represented by another t-bit sequence $(v_1, v_2, \ldots, v_t)$. The block encryption method further includes an outputting that concatenates the as-permuted k-number of blocks to output the concatenated blocks. The present method is bound up with a specified machine (computer) that encrypts and decrypts input data.

In a third aspect, the present invention provides a program for allowing a computer to perform: the processing of dividing input data into a k-number of blocks, and the processing of performing Feistel permutation for an R-number of rounds. The processing of Feistel permutation performs Feistel permutation, with two blocks as a set, using an encryption key generated from one round to another. The program also allows the computer to perform the processing of block permutation which is equivalent to a binary de Bruijn graph with symmetric type 2 branch coloring having a 2t-number, equal to one-half the number of division k, of nodes, where t>2. The de Bruijn graph indicates a transitioning from an even-numbered block to an odd-numbered block with an arrow line of a first color and indicating a transitioning from an odd-numbered block to an even-numbered block with an arrow line of a second color, using the above mentioned functions that decide on the colors of the arrow lines from a node u represented by a t-bit sequence $(u_1, u_2, \ldots, u_t)$ to a node v represented by another t-bit sequence $(v_1, v_2, \ldots, v_t)$. The program also allows the computer to perform the processing that concatenates the as-permuted k-number of blocks to output the concatenated blocks. It is noted that the program may be recorded on a computer readable recording medium. Also the computer program may be regarded as either a program product (i.e. manufacture) or a process embodying the data storage method (process), expressed in a program language.

The meritorious effects of the present invention are summarized as follows without limitation.

According to the present invention, there may be provided such block cipher that may be up to satisfy pseudorandomness and strong-pseudorandomness with a smaller number of rounds by using a generalized Feistel network. The reason is that, as may be apparent from the binary de Bruijn graph, the sufficient distance (SD) in case the block permutation of the present invention is expressed by a graph colored in two colors becomes sufficiently smaller than in case of cyclic permutation.

PREFERRED MODES

Initially, the summary of the present invention is shown. The block encryption device according to the present invention includes an input unit that divides input data into a k-number of blocks, a Feistel permutation unit for an R-number of rounds, a block permutation unit, and an output unit. The Feistel permutation unit performs Feistel permutation, with two blocks as a set, using an encryption key generated from one round to another. The block permutation unit performs block permutation equivalent to a binary de Bruijn graph with symmetric type 2 branch coloring having a $2^t$-number, equal to one-half the number of division k, of nodes, where t>2. The de Bruijn graph indicates a transitioning from an even-numbered block to an odd-numbered block with an arrow line of a first color, while indicating a transitioning from an odd-numbered block to an even-numbered block with an arrow line of a second color, using functions colorfunc $(u, v)=v_t$ if $u_1=u_t$ and colorfunc $(u, v)=v_t+1$ if $u_1 \neq u_t$. These functions decide on the colors of the arrow lines from a node u represented by a t-bit sequence $(u_1, u_2, \ldots, u_t)$ to a node v represented by another t-bit sequence $(v_1, v_2, \ldots, v_t)$. The output unit concatenates the as-permuted k-number of blocks to output the concatenated blocks.

The processing of block permutation in the block permutation unit, equivalent to the binary de Bruijn graph with symmetric type 2 branch coloring, may be implemented by permuting the intermediate text $Y=(y[0], y[1], \ldots, y[k-1])$, output by the Feistel permutation, in such a manner that, when a block number i (i=0 to k−1) is less than k/2 and
if i mod 4 is 0, permutation is to be $y[i]=z[2i+1 \bmod k]$;
if i mod 4 is 1, permutation is to be $y[i]=z[2i \bmod k]$;
if i mod 4 is 2, permutation is to be $y[i]=z[2i+3 \bmod k]$; and
if i mod 4 is 3, permutation is to be $y[i]=z[2i-2 \bmod k]$; and
that when a block number i is not less than k/2 and
if i mod 4 is 0, permutation is to be y[i]=z[2i+3 mod k];
if i mod 4 is 1, permutation is to be y[i]=z[2i−2 mod k];
if i mod 4 is 2, permutation is to be y[i]=z[2i+1 mod k]; and
if i mod 4 is 3, permutation is to be y[i]=z[2i mod k].

At this time, (z[0], z[1], . . . , z[k−1]) is output as a round output text Z. The Feistel permutation and the block permutation are repeated a number of times required, and finally a Feistel permutation is performed to output a ciphertext.

Exemplary Embodiment 1

Figure 1:
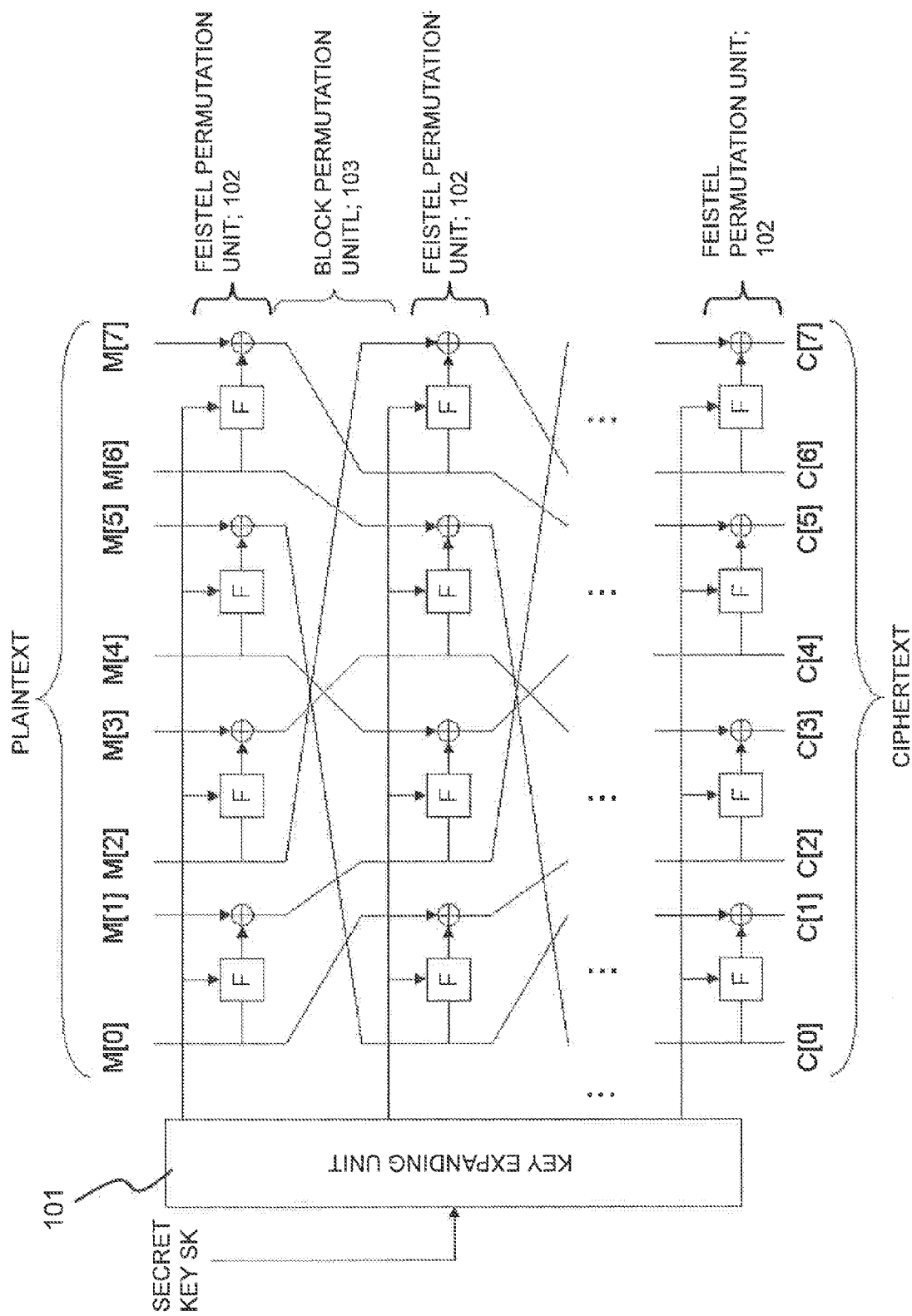
FIG. 1 is a diagram showing an arrangement of an exemplary embodiment 1 of the present invention ([Struc1]).
Figure 2:
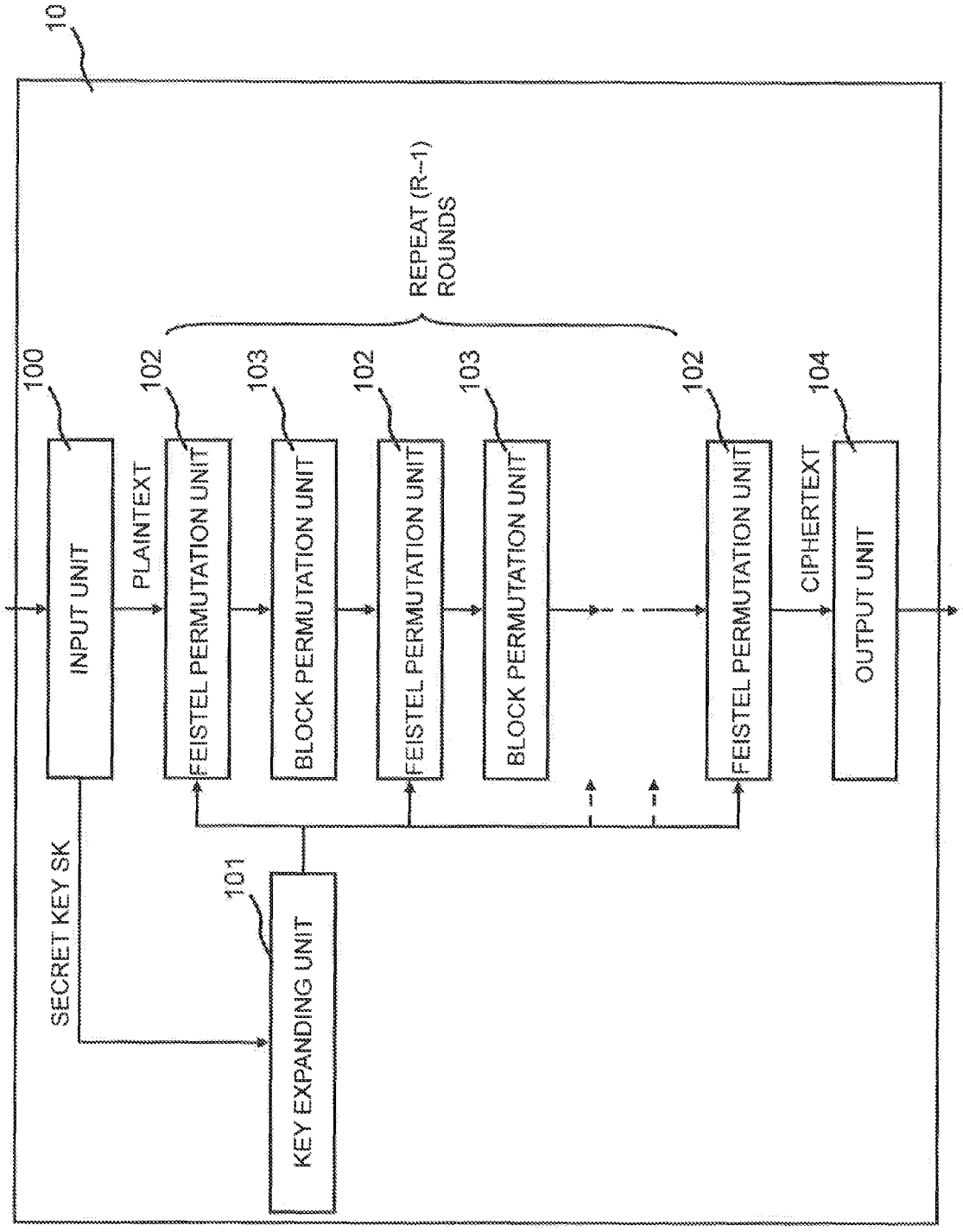
FIG. 2 is a diagram showing the arrangement of the exemplary embodiment 1 of the present invention in terms of processing blocks ([Block1]).

An exemplary embodiment 1 of the present invention will now be described with reference to the drawings. FIG. 1 'Struct1' shows an arrangement of the exemplary embodiment 1 of the present invention. FIG. 2 'Block 1' shows the arrangement of the exemplary embodiment 1 of the present invention in terms of processing blocks.

Referring to FIG. 2, there is shown a block encryption device 10 including an input unit 100, a key expanding unit 101, a plurality of Feistel permutation units 102 for an R-number of rounds, an (R−1) number of block permutation units 103 and an output unit 104.

The block encryption device 10 may be implemented by any of a variety of information processing devices provided e.g., with a CPU, a memory and a disc, for example. The above mentioned components of the block encryption device 10 may be implemented by having a program stored on the disc and by running the program on the CPU.

The above mentioned components of the block encryption device 10 will now be described in detail. It is noted that, in the description to follow, the number of division k of the block cipher is to be a certain number $2^{t+1}$, where t is a positive number not less than 2. The number of rounds is R.

The input unit 100 is a means to enter a plaintext M of interest and a secret key SK. The input unit 100 may be implemented by, for example, a device to enter data from outside or a letter/character input device, such as a keyboard.

The key expanding init 101 is a means to produce keys for the R-number rounds of the round functions. The key expanding unit may be any function provided that it inputs the secret key SK and has a sufficient output width.

The Feistel permutation unit 102 splits an input text X (n×k bits) to the round into a k-number of n-bit unit blocks x[0], x[1], . . . , x[k−1], and applies Feistel permutation to two neighboring blocks as block sets to output an intermediate text Y=(y[0], y[1], . . . , y[k−1]).

It is noted that the input text X to the first round is a plaintext M by default. Each Feistel permutation is expressed by (y[0], y[1], . . . , y[k−1])=(x[0], F(x[0])+x[1], x[2], F(x[2])+x(3), . . . , x[k−2], F(x[k−2])+x[k−1]). It is also noted that F is an n-bit input/output round function and that its key is derived by the key expanding unit 101. The key of each round function may be different with indices of even-numbered blocks being processed (0, 2, . . . , k−2), or may be the same.

The block permutation unit 103 permutes an intermediate text Y=(y[0], y[1], . . . , y[k−1]) in terms of a n-bit block as a unit to produce a round output text Z=(z[0], z[1], . . . , z[k−1]). The permutation by the block permutation unit is defined by type 2 branch coloring of a binary de Bruijn graph B(s) in accordance with the following rule:

A binary de Bruijn graph B(t) having $2^t$ nodes, each of which is represented by t-bit strings (00 . . . 0, 00 . . . 1, . . . , 11 . . . 1).

In branch coloring with two colors, the colors are red (fine lines; first color) and blue (thick lines; second color). In binary representation, these colors are associated with 0 and 1.

If there is a branch from a node u (=$u_1$, $u_2$, . . . , $u_t$) to a node v (=$v_1$, $v_2$, . . . , $v_t$), the following functions colorfunc:
[colorfunc]

colorfunc($u,v$)=$v_t$ if $u_1$=$u_t$ and colorfunc($u,v$)=$v_t$+1 if $u_1$≠$u_t$ is used to decide on the binary expression of the color for the branch. It is noted that $v_t$+1 is bit inversion of $v_t$. Specifically, with $u_1$=$u_t$, for example, the color of a branch for a node LS(u)‖0, corresponding to a (n−1) bit sequence from the uppermost bit of u, to which is appended 0 from right side, is colored in red (or expressed with a fine line or with 0 in binary representation). The color of a branch for a node LS(u)‖1, corresponding to a (n−1) bit sequence from the uppermost bit of u, to which is appended 1 from right side, is colored in blue (or expressed with a thick line or with 1 in binary representation).

In similar manner, for $u_1$≠$u_t$, the coloring rule is inverted for coloring. This coloring method is the type 2 branch coloring for the binary de Bruijn graph B(t) and is symmetrical.

Figure 3:
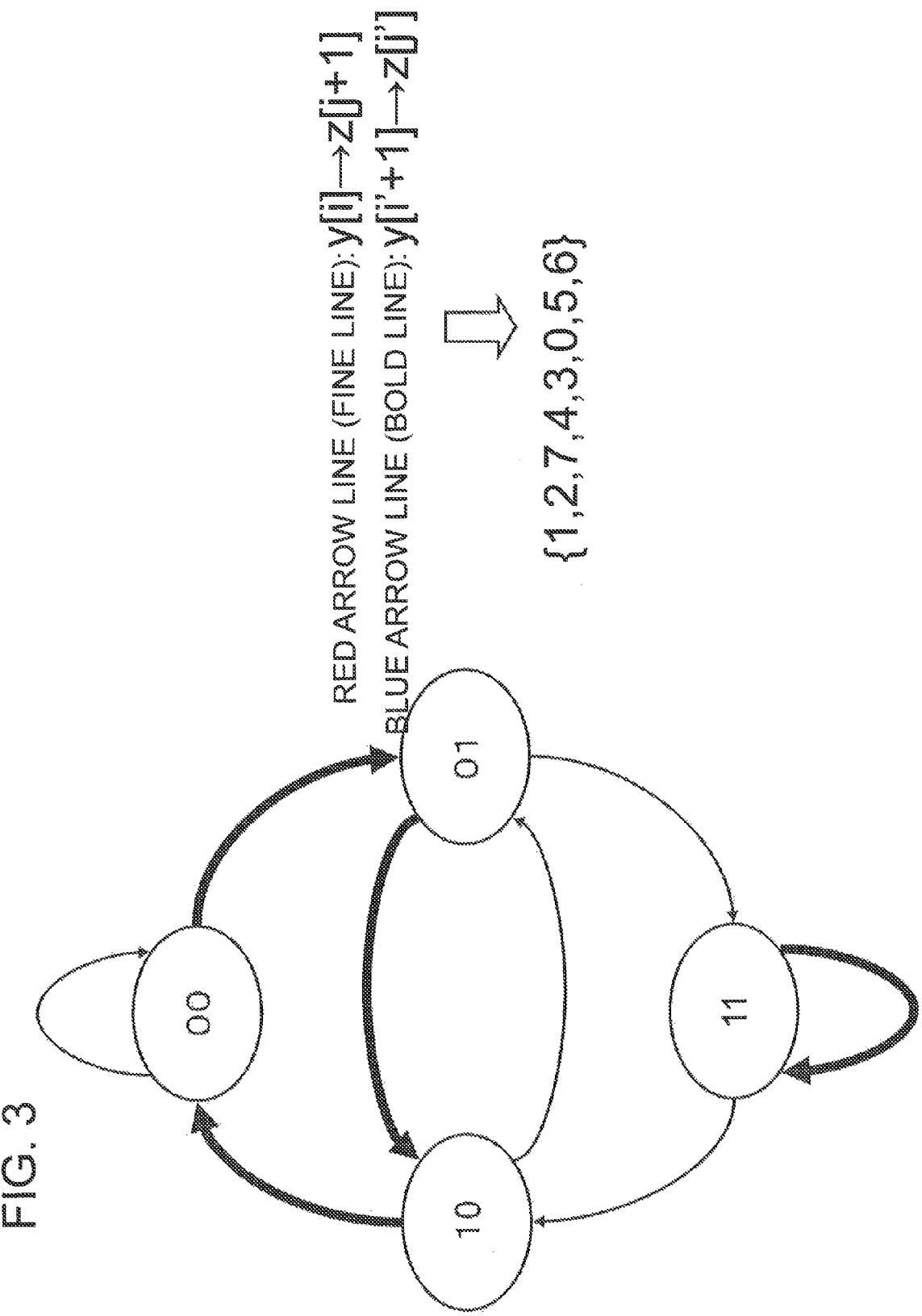
FIG. 3 is a schematic view showing a list form corresponding to a drawing [CdB0] showing, in a graph, the block permutation of the exemplary embodiment 1 with the number of division equal to 8, with thick lines indicating blue (second color) and with fine lines indicating red (first color).

FIG. 3 [CdB0] shows a binary de Bruijn graph, obtained by symmetrical type 2 branch coloring with the number of division k=8. As indicated on the right side of the drawing, with the number of division k=8, the permutation BlockPerm may be expressed by a graph having k/2, that is, $2^{(3-1)}$, nodes. With s=(k/2)−1, the nodes in the graph are labeled by nodes=0, 1, 2, 3. Given a directed graph in which branches are colored in two colors by the above function colorfunc, the permutation BlockPerm is uniquely determined by having a red branch (fine line) from a node m to a node n associated with permutation of an even-numbered block y[2m] by an odd-numbered block z[2n+1] and by having a blue branch (thick line) from a node m' to a node n' associated with permutation of an odd-numbered block y[2m'+1] by an even-numbered block z[2n']. The block permutation of [CdB0] of FIG. 3 corresponds to block permutation by the block permutation unit 103 of FIG. 1, and may be expressed by a list of {1, 2, 7, 4, 3, 0, 5, 6}.

The permutation by the above coloring method may be expressed, in terms of a round input text Y=(y[0], y[1], . . . , y[k−1]) and a round output text Z=(z[0], z[1], . . . , z[k−1]), such that, in case the block number i is k/2 or less and
if i mod 4 is 0, y[i]=z[2i+1 mod k];
if i mod 4 is 1, y[i]=z[2i mod k];
if i mod 4 is 2, y[i]=z[2i+3 mod k]; and
if i mod 4 is 3, y[i]=z[2i−2 mod k]; and such that, in case the block number i is k/2 or more and
if i mod 4 is 0, y[i]=z[2i+3 mod k];
if i mod 4 is 1, y[i]=z[2i−2 mod k];
if i mod 4 is 2, y[i]=z[2i+1 mod k]; and
if i mod 4 is 3, y[i]=z[2i mod k].

It is noted that permutation in which the arrow direction of the graph of FIG. 3 is reversed may also be implemented. In such case, it is only sufficient that the sequence of the block numbers in FIG. 1 is reversed.

The output unit 104 is a means to concatenate Y=(y[0], y[1], . . . , y[k−1]) output from the Feistel permutation unit 102 of the last stage to output a ciphertext. Specifically, the output unit may be implemented by a computer display, a printer or any of a variety of data output devices.

The processing operations by the above described block encryption device may be implemented by a program executed by a computer composing the block encryption device.

Figure 4:
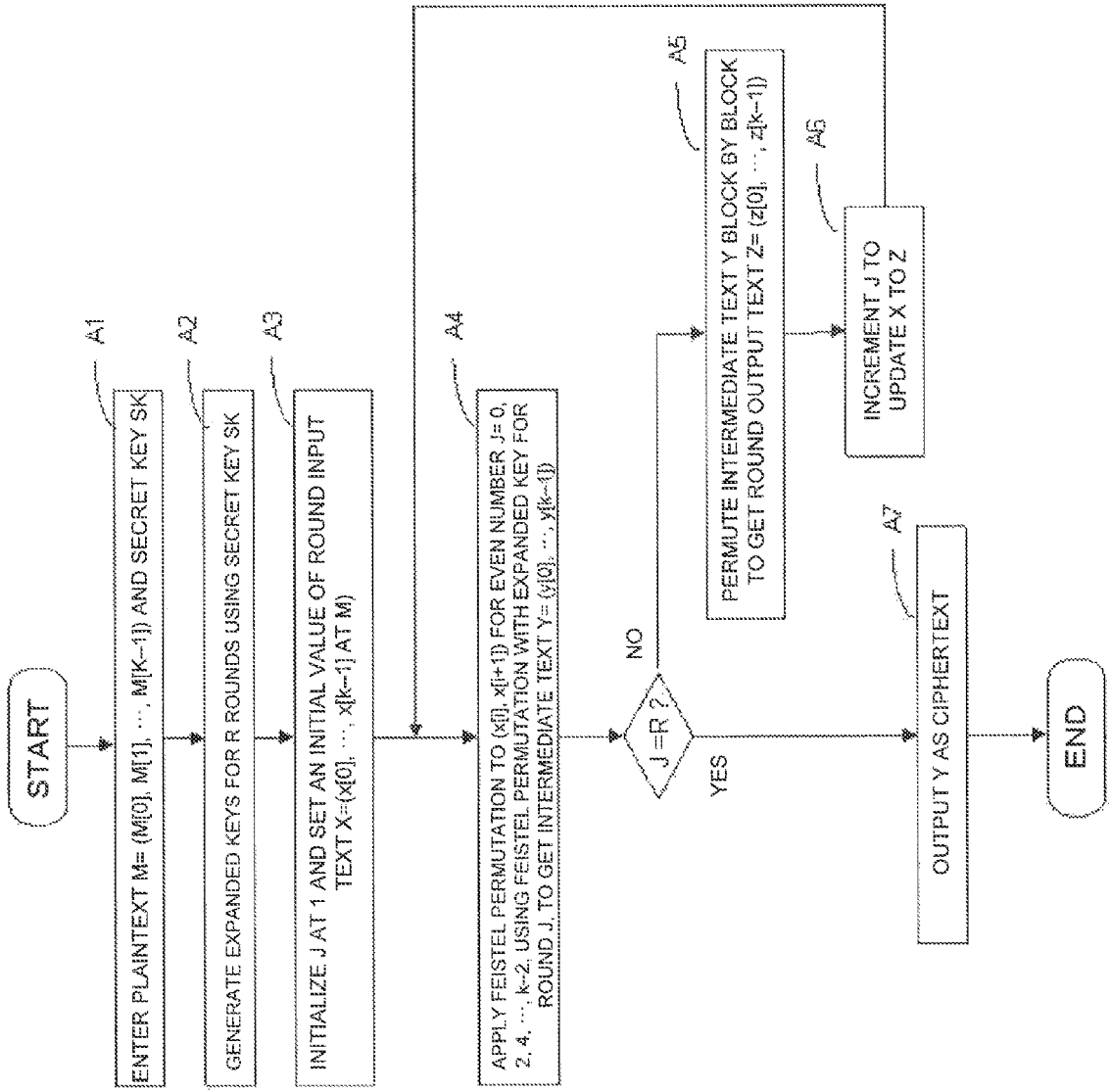
FIG. 4 is a flowchart showing the operation of the exemplary embodiment 1 of the present invention ([Flow1]).

The operation of the block encryption device according to the exemplary embodiment 1 of the present invention will now be explained in detail with reference to the drawings. FIG. 4 'FLOW1' depicts a flowchart illustrating the operation of the exemplary embodiment 1 of the present invention.

Referring to FIG. 4, a plaintext M and a secret key SK are delivered to the input unit 100 (step A1 of FIG. 4). The key expanding unit 101 then generates expanded keys for the R-number of rounds, using the secret key SK (step A2 of FIG. 4).

A counter for counting the number of rounds J is set to 1 (J=1). A round input text X=(x[0], x[1], . . . , x[k−1]) is set at the plaintext M (step A3 of FIG. 4) by default. The Feistel permutation that uses the expanded key of the J'th round is applied to a set of blocks of even numbers (i=0, 2, 4, . . . , k−2) and odd-numbered blocks (x[i], x[i+1]) to obtain an intermediate text Y=(y[0], y[1], . . . y[k−1]) (step A4 of FIG. 4).

If the count number of the counter J is less than R, the intermediate text Y is permuted block by block to obtain a round output text Z=(z[0], z[1], . . . , z[k−1]) (step A5 of FIG. 4). The counter j is incremented (increased by one) and subsequently the round input text X is updated to Z (step A6 of FIG. 4).

In case the counter J is coincident with R, the output unit 104 outputs, as the ciphertext, the intermediate text Y obtained (step A7 of FIG. 4).

As described above, if desired to generate the ciphertext, the round input text X is set at the plaintext M by default. The Feistel permutation unit 102 then generates the intermediate text Y from the input text X. The block permutation unit 103 then permutes the intermediate text Y to generate the round output text Z to update the contents of the round input text X to Z. This processing is repeated for the R rounds to produce the ciphertext. It is noted that, in the present exemplary embodiment, the block permutation unit 103 of the last Rth round does not contribute to improving the safety and hence is omitted. Hence, the Feistel permutation unit 102 executes the processing a sum total of R times, while the block permutation unit 103 executes the processing a sum total of (R−1) times.

Figure 5:
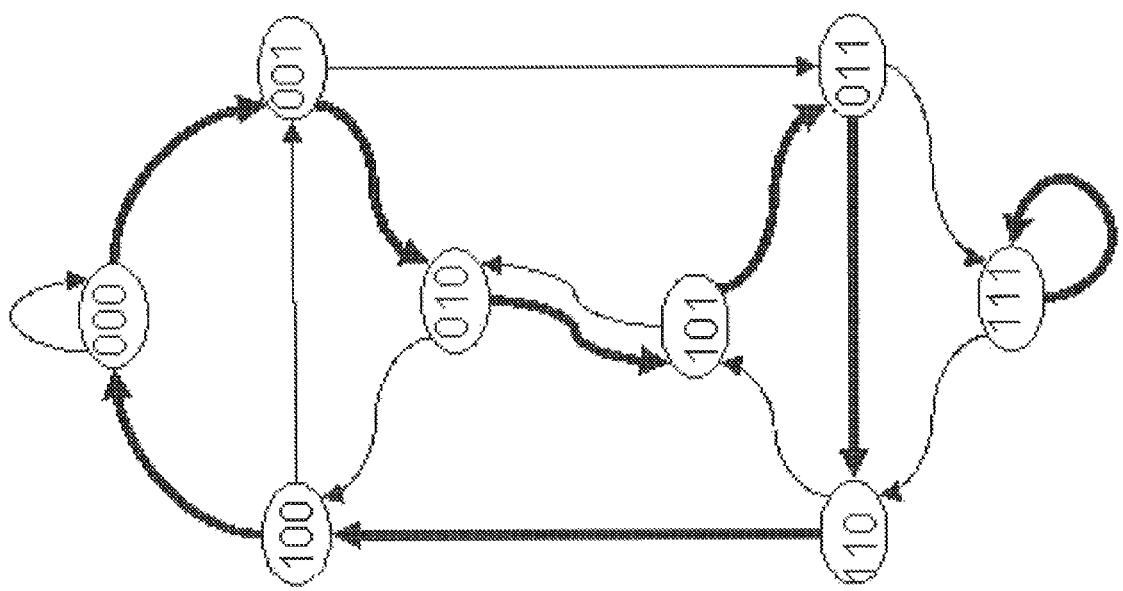
FIG. 5 is a schematic view showing, in a graph, the block permutation of the exemplary embodiment 1 with the number of division equal to 16, with thick lines indicating blue (second color) and with fine lines indicating red (first color) [CdB1]).

The above block permutation, shown in FIGS. 1 and 3, is for the number of division equal to 8. It is however possible to draw a graph in similar manner to uniquely define the block permutation in case the number of division is increased. FIG. 5 [CdB1] and FIG. 6 [CdB2] respectively show binary de Bruijn graphs with symmetrical type 2 branch coloring in case the number of division is 16 (t=3 equivalent to k=16) and 32 (t=4 equivalent to k=32).

It is noted that block permutation, shown in FIGS. 5 and 6, may be expressed in a list form as follows:

The graph of FIG. 5 for t=3 and the number of division k=16 may be expressed in the list form by {1, 2, 7, 4, 9, 10, 15, 12, 3, 0, 5, 6, 11, 8, 13, 14}.

Figure 6:
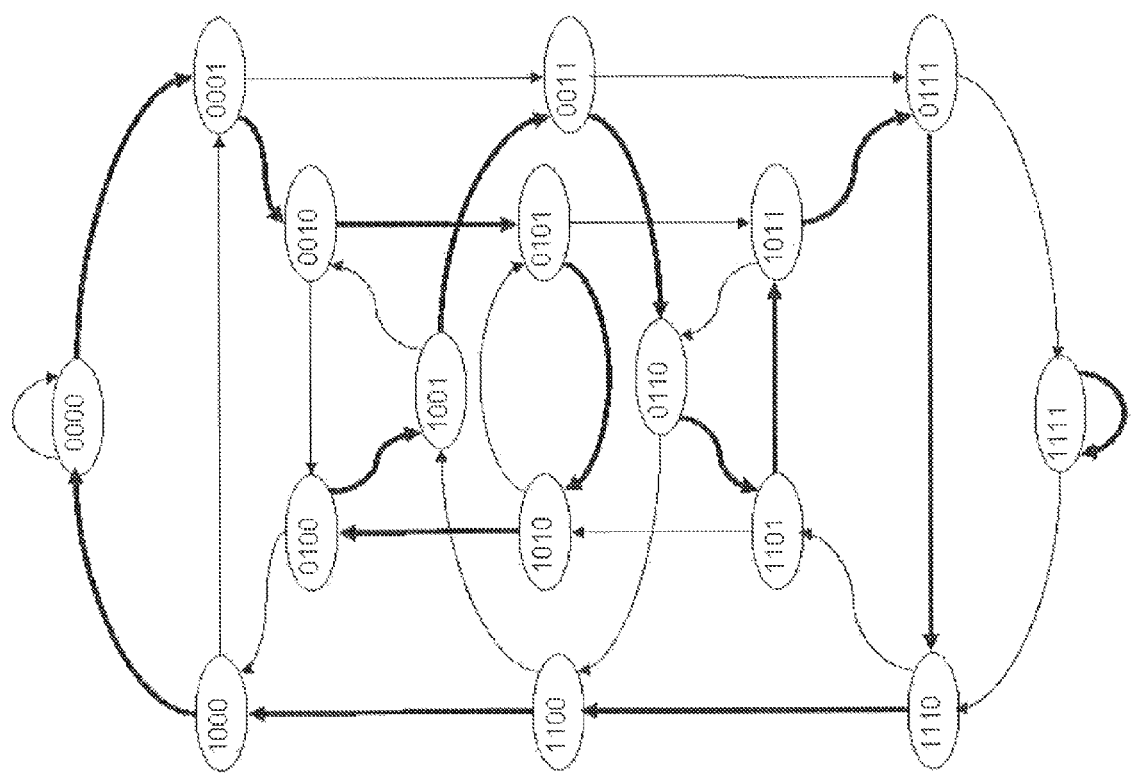
FIG. 6 is a schematic view showing, in a graph, the block permutation of the exemplary embodiment 1 with the number of division equal to 32, with thick lines indicating blue (second color) and with fine lines indicating red (first color) [CdB2].

The graph of FIG. 6 for t=4 and the number of division k=32 may be expressed in the list form by {1, 2, 7, 4, 9, 10, 15, 12, 17, 18, 23, 20, 25, 26, 31, 28, 3, 0, 5, 6, 11, 8, 13, 14, 19, 16, 21, 22, 27, 24, 29, 30}.

Figure 7:
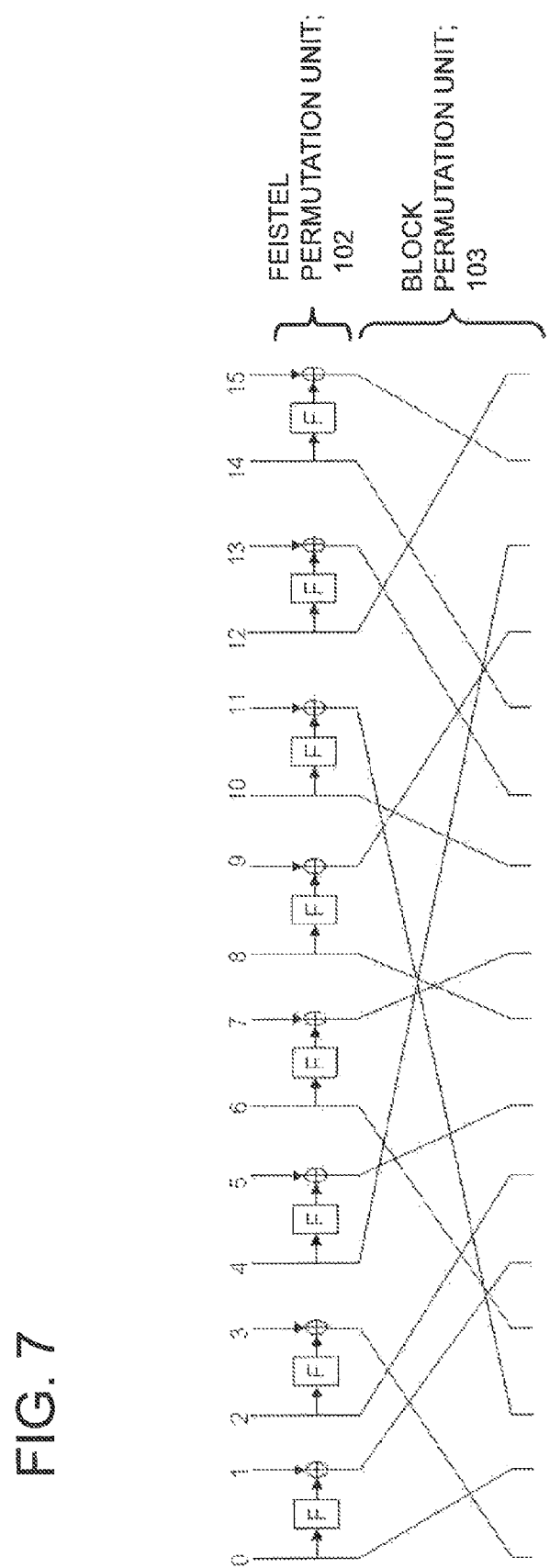
FIG. 7 is a diagram showing block permutation corresponding to the graph of FIG. 4 ([CdB1]), with the number of division being 16 ([Perm1]).

FIG. 7 [Perm1] shows block permutation corresponding to the graph of FIG. 5 [CdB1] with the number of division of 16. With the number of division of 16, the Feistel permutation unit 102 and the block permutation unit 103 of FIG. 1 correspond to those shown in FIG. 7 [Perm1].

In the present exemplary embodiment, having the block permutation unit 103, described above, the minimum number of rounds necessary for pseudorandomness and strong-pseudorandomness may be reduced, without substantially changing the amount of calculations for one round in comparison with the case of the block cipher of the generalized Feistel network that uses conventional cyclic permutation.

This may be derived from the fact that the sufficient distance (SD) in case of expressing block permutation by a graph in which branches are colored in blue (in thick lines) and red (in fine lines) becomes appreciably smaller than that in the case of the cyclic permutation. The sufficient distance (SD) being N denotes that, in case a rule for movement between nodes that first two and last movements are blue and the red branches are not used in succession, that is, that a blue branch is necessarily used after movement that uses the red branch, is followed, there should exist a path of a length N between two arbitrary nodes.

The sufficient distance (SD) is directly proportionate to the number of rounds necessary for pseudorandomness, such that, if the sufficient distance is N, the pseudorandomness may be guaranteed for the number of rounds equal to N+2. Moreover, in case the sufficient distance of inverse permutation, as used on the decryption side, is N, strong-pseudorandomness may also be guaranteed for the number of rounds equal to 2N+2.

Figure 8:
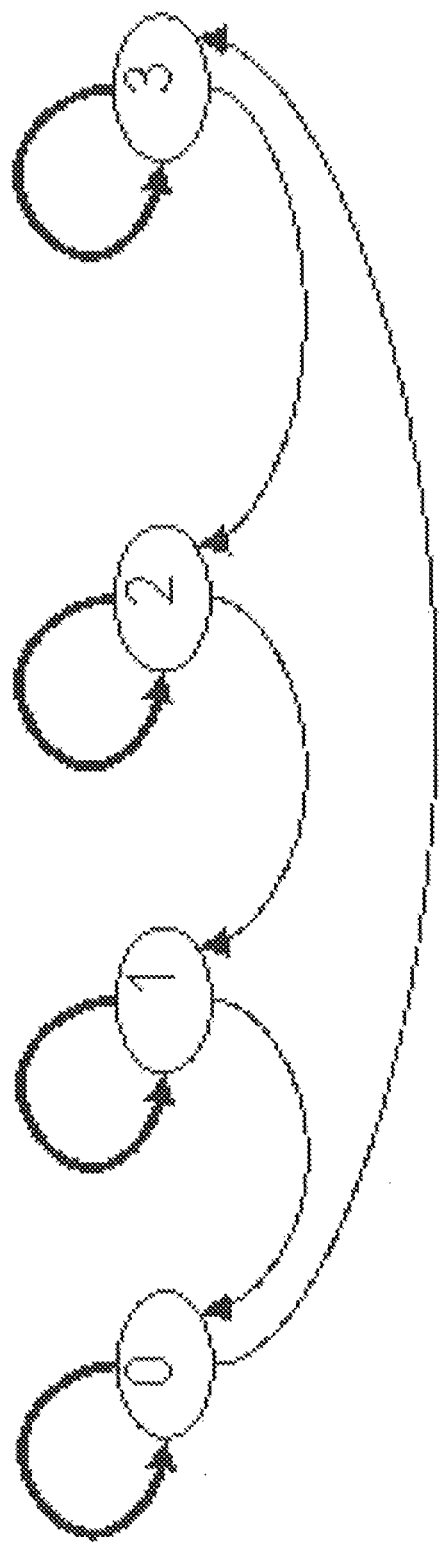
FIG. 8 is a schematic view showing, in a graph, left cyclic permutation, with thick lines indicating blue (second color) and with fine lines indicating red (first color) ([Cyclicgrp]).

In the graph of cyclic permutation of FIG. 8 Cyclicgph, in which the permutation with the number of division of 8 is shown, the sufficient distance is twice the number of the nodes, that is, equal to the number of division k. If, in the block permutation, as used in the present exemplary embodiment, the value of k is set at a fairly large value, the sufficient distance of 2Logk is attained for both the permutation and inverse permutation. Specifically, with the block permutation of k=32, based on the binary de Bruijn graph B(4), with k=32, shown in FIG. 6, the sufficient distance of 8 is attained. On the other hand, with the block permutation of k=32, the sufficient distance is 32. It is thus possible to reduce the number of rounds needed for each of pseudorandomness and strong-pseudorandomness by ca. 65%.

Non-Patent Document 3 shows the binary de Bruijn graph. However, in the graph shown in the Non-Patent Document 3, the even- and odd-numbered blocks are not continually changed (see e.g., the leftmost graph of FIG. 9 of the Non-Patent Document 3). Moreover, there lacks in the Non-Patent Document 3 the description on how the binary de Bruijn graph with symmetric type 2 branch coloring may generally be obtained. In the Non-Patent Document 3, the 8-node binary de Bruijn graph B(3) is just slightly modified and coloring is also not optimum in making a proposal of Armenian shuffle which is the permutation with the number of division k equal to 16.

It is evident from the present exemplary embodiment that, apart from the inherent difference of using GFN in comparison with the Non-Patent Document 3, the present invention is universal in that it may deal with the number of division different from 16. According to the present invention, it is possible to flexibly set the block size of the target block cipher and the input/output width of the round functions.

In distinction from the Armenian shuffle, the permutation by the symmetric type 2 branch colored binary de Bruijn graph according to the present invention exhibits left-right symmetry. It is thus possible to reduce the program size or the size of circuit implementation.

Exemplary Embodiment 2

An exemplary embodiment 2 of the present invention will now be described. In the second exemplary embodiment, the graph and block permutation according to the above first exemplary embodiment is changed. The present exemplary embodiment is basically similar in configuration to the block encryption device of the exemplary embodiment 1 shown in FIG. 2, and has altered its block permutation. Hence, the following explanation is centered about such point of difference.

Figure 9:
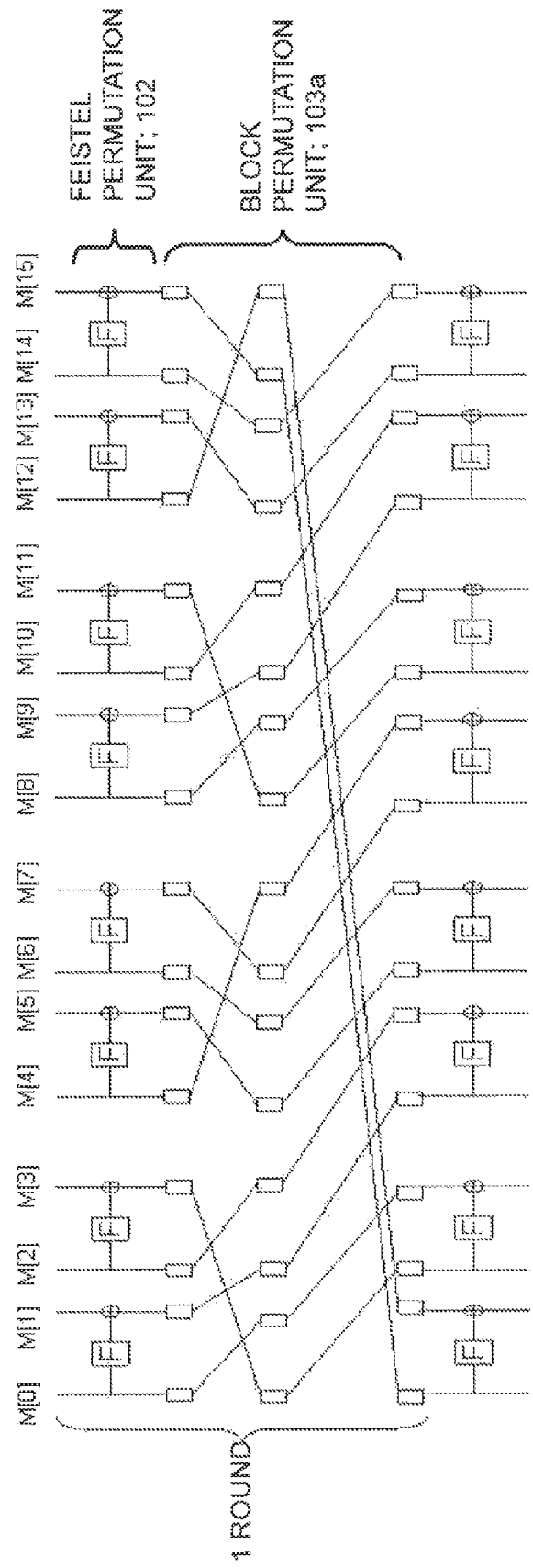
FIG. 9 is a diagram showing an arrangement of one round of an exemplary embodiment 2 of the present invention, with the number of division being 16 ([Struc2]).

FIG. 9 [Struc2] shows an arrangement of one round of the exemplary embodiment 2 of the present invention with the number of division equal to 16.

In the present exemplary embodiment, the number of division k is a multiple of 8. Here, it is 16, with w=2.

Figure 10:
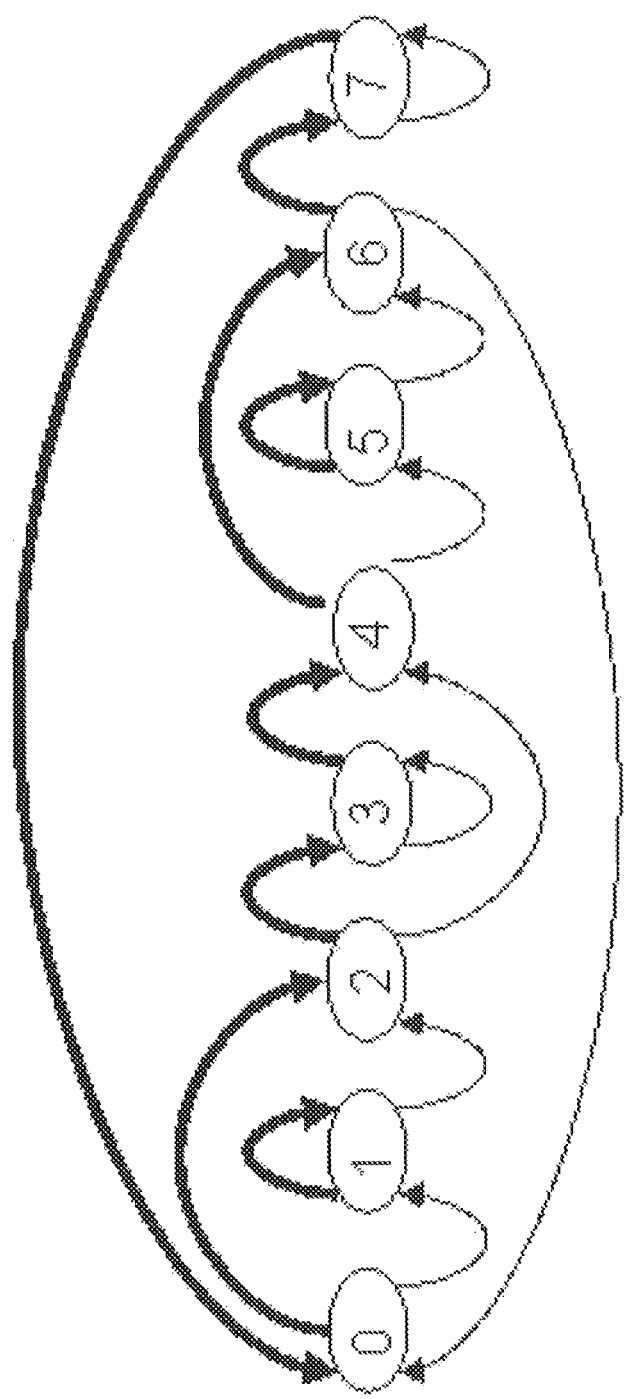
FIG. 10 is a schematic view showing, in a graph, the block permutation of the exemplary embodiment 2 with the number of division equal to 16, with thick lines indicating blue (second color) and with fine lines indicating red (first color) ([SS1]).
Figure 11:
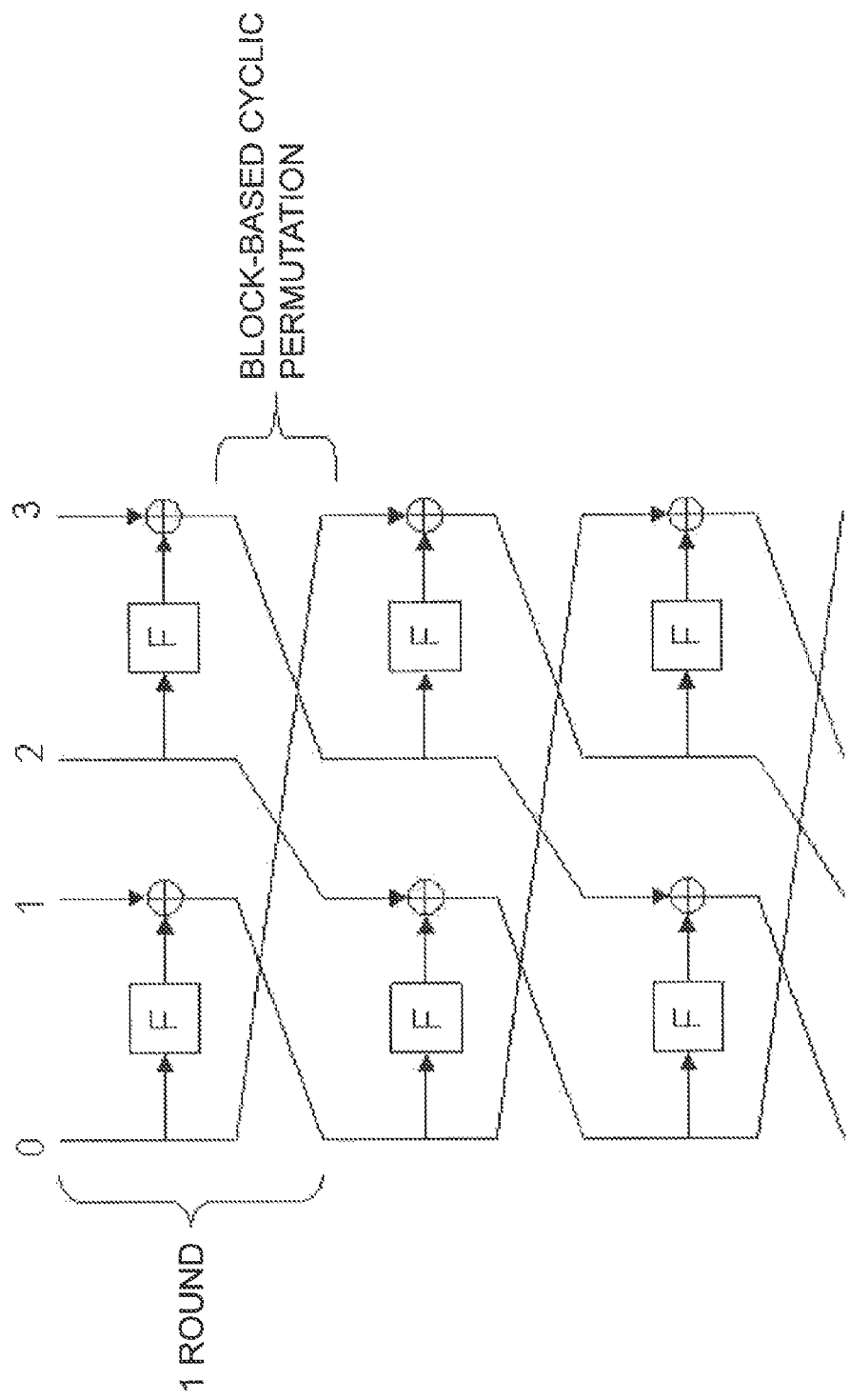
FIG. 11 is a diagram showing an example of GFN employing cyclic permutation with the number of division k=4 ([CyclicGFN]).

The permutation performed by the block permutation unit 103 re-arrays the intermediate text Y=(y[0], y[1], . . . , y[k−1]), in terms of n-bit blocks as a unit, to obtain an output text of the round Z=(z[0], z[1], . . . , z[k−1]), and is defined by a graph referred to below as 'stepping stone graph (SS)'. This graph will now be defined as follows:

FIG. 10 [SS1] shows the block permutation of the exemplary embodiment 2 of the present invention by a stepping stone graph (SS), with the number of division being 16. A thick line corresponds to the blue color (second color), with a fine line corresponding to the red color (first color).

The stepping stone graph (SS) is such a graph in which, as in the exemplary embodiment 1, the number of nodes is one-half the number of division k, that is, 4w, and coloring is by type 2 branch coloring, with the number of the orders being 2.

The stepping stone graph (SS) is a directed graph composed by adding colored arrow lines in such a way that a node 4j adds a red (first color) branch to a node 4j+1, and adds a blue (second color) branch to a node 4j+2;

a node 4j+1 adds a red (first color) branch to a node 4j+2, and adds a blue (second color) branch to a node 4j+1;

a node 4j+2 adds a red (first color) branch to a node 4j+1, and adds a blue (second color) branch to a node 4j+3; and a node 4j+3 adds a red (first color) branch to a node 4j+3, and adds a blue (second color) branch to a node 4j+1;

for each node (j=0, 1, . . . , w−1). Note that the node 4w is regarded to be the node 0.

The permutation by the graph of FIG. 10 [SS1] is equivalent to the operation performed by a block permutation unit 103a of FIG. 9, viz., to the operation of cyclic permutation in terms of four blocks as a unit followed by the operation of rightward 2-block cyclic permutation of the k-number of the blocks in their entirety. For the 4-block based cyclic permutation, the directions of cyclic permutation are alternately rightward and leftward.

In the present exemplary embodiment, having the block permutation unit 103a, the minimum number of rounds needed in light of pseudorandomness and strong-pseudorandomness may be reduced in comparison with the block cipher of the generalized Feitel network employing state-of-the-art cyclic permutation, without substantially changing the amount of calculations for one round operation. This may be derived because the above mentioned sufficient distance (SD) may be ca. k/4+8. Specifically, the sufficient distance of 16 may be attained by permutation of k=32 based on the stepping stone graph (SS), whereas it is 32 in the cyclic permutation of k=32.

Moreover, the present exemplary embodiment is simple in implementation because permutation is based on combining one-block cyclic permutation, in terms of four blocks as a unit, and two-block cyclic permutation, for the total of the k-number of blocks, as shown in FIG. 9.

Although the description has been made of preferred exemplary embodiments of the present invention, such exemplary embodiments are given only by way of illustration and are not intended to limit the scope of the present invention. That is, further modifications, substitutions or adjustments may be made without departing from the basic technical concept of the present invention. For example, the block encryption device of the exemplary embodiment described above may operate as a decryption device with the configuration of the device remaining unchanged.

The particular exemplary embodiments or examples may be modified or adjusted within the scope of the entire disclosure of the present invention, inclusive of claims, based on the fundamental technical concept of the invention. In addition, a variety of combinations or selection of elements disclosed herein may be made within the context of the claims. That is, the present invention may cover a wide variety of modifications or corrections that may occur to those skilled in the art in accordance with the entire disclosure of the present invention, inclusive of claims, and the technical concept of the present invention.

EXPLANATION OF REFERENCE NUMERALS

10 block encryption device
100 input unit
101 key expanding unit
102 Feistel permutation unit
103, 103a block permutation units
104 output unit

The invention claimed is:

1. A block encryption device comprising:
an input unit configured to divide input data into a k-number of blocks;
a Feistel permutation unit for an R-number of rounds, the Feistel permutation unit configured to perform Feistel permutation, with two blocks as a set, using an encryption key generated from one round to another;
a block permutation unit configured to perform block permutation equivalent to a binary de Bruijn graph with symmetric type 2 branch coloring, having a 2t-number, equal to one-half the number of division k, of nodes, where t>2,
the de Bruijn graph indicating a transitioning from an even-numbered block to an odd-numbered block with an arrow line of a first color and indicating a transitioning from an odd-numbered block to an even-numbered block with an arrow line of a second color, using the following functions:

colorfunc($u,v$)=$vt$ if $u1$=$ut$ and colorfunc($u,v$)=$vt+1$ if $u1 \neq ut$ that decide on the colors of the arrow lines from a node u represented by a t-bit sequence (u1, u2, . . . , ut) to a node v represented by another t-bit sequence (v1, v2, . . . , vt); and
an output unit configured to concatenate the as-permuted k-number of blocks to output the concatenated blocks.

2. The block encryption device according to claim 1, wherein,
the block permutation unit is further configured to input an intermediate text Y=(y[0] . . . , y[k−1]), to output from the Feistel permutation unit, and to apply the permutation in which
when a block number i from 0 to k−1 is less than k/2 and if i mod 4 is 0, permutation is to be y[i]=z[2i+1 mod k];
if i mod 4 is 1, permutation is to be y[i]=z[2i mod k];
if i mod 4 is 2, permutation is to be y[i]=z[2i+3 mod k]; and if i mod 4 is 3, permutation is to be y[i]=z[2i−2 mod k]; and
  in which when a block number i is not less than k/2 and
if i mod 4 is 0, permutation is to be y[i]=z[2i+3 mod k];
if i mod 4 is 1, permutation is to be y[i]=z[2i−2 mod k];
if i mod 4 is 2, permutation is to be y[i]=z[2i+1 mod k]; and
if i mod 4 is 3, permutation is to be y[i]=z[2i mod k];
to output a round output text Z=(z[0], . . . , z[k−1]).

3. A block encryption device comprising:
an input unit configured to divide input data into a k-number of blocks;
a Feistel permutation unit for an R-number of rounds, the Feistel permutation unit configured to perform Feistel permutation, with two blocks as a set, using an encryption key generated from one round to another;
a block permutation unit configured to perform block permutation equivalent to a directed graph of the number of orders of 2, with symmetrical type 2 branch coloring, having a 4w-number, equal to one-half the number of division k, of nodes, where w>1, in which transitioning from an even-numbered block to an odd-numbered block is represented by an arrow line of a first color and the transitioning from an odd-numbered block to an even-numbered block is represented by an arrow line of a second color, in such a manner that,
from a node 4j, transitioning of an arrow line of a first color is to a node 4j+1 and transitioning of an arrow line of a second color is to a node 4j+2,
from a node 4j+1, transitioning of an arrow line of a first color is to a node 4j+2 and transitioning of an arrow line of a second color is to a node 4j+1,
from a node 4j+2, transitioning of an arrow line of a first color is to a node 4j+1 and transitioning of an arrow line of a second color is to a node 4j+3, and
from a node 4j+3, transitioning of an arrow line of a first color is to a node 4j+3 and transitioning of an arrow line of a second color is to a node 4j+1,
for each node (j=0, 1, . . . , w−1); where the node 4w is regarded to be a node 0; and
an output unit configured to concatenate the as-permuted k-number of blocks to output the concatenated blocks, wherein
the number of division k into the blocks is a multiple of 8.

4. A block encryption method, comprising:
dividing input data into a k-number of blocks;
performing Feistel permutation for an R-number of rounds, the Feistel permutation performing Feistel permutation, with two blocks as a set, using an encryption key generated from one round to another;
performing block permutation equivalent to a binary de Bruijn graph with symmetric type 2 branch coloring, having a 2t-number, equal to one-half the number of division k, of nodes, where t>2,
the de Bruijn graph indicating a transitioning from an even-numbered block to an oddnumbered block with an arrow line of a first color and indicating a transitioning from an oddnumbered block to an even-numbered block with an arrow line of a second color, using the following functions:

colorfunc($u,v$)=$vt$ if $u1$=$ut$ and colorfunc($u,v$)=$vt$+1 if $u1 \neq ut$ that decide on the colors of the arrow lines from a node u represented by a t-bit sequence
(u1, u2, . . . , ut) to a node v represented by another t-bit sequence (v1, v2, . . . vt); and
outputting that concatenates the as-permuted k-number of blocks to output the concatenated blocks.

5. The block encryption method according to claim 4, wherein,
the block permutation inputs an intermediate text Y=(y[0] . . . , y[k−1]), output from the Feistel permutation step, and applies the permutation in which
when a block number i from 0 to k−1 is less than k/2 and
if i mod 4 is 0, permutation is to be y[i]=z[2i+1 mod k];
if i mod 4 is 1, permutation is to be y[i]=z[2i mod k];
if i mod 4 is 2, permutation is to be y[i]=z[2i+3 mod k]; and
if i mod 4 is 3, permutation is to be y[i]=z[2i−2 mod k]; and
in which,
when a block number i is not less than k/2 and
if i mod 4 is 0, permutation is to be y[i]=z[2i+3 mod k];
if i mod 4 is 1, permutation is to be y[i]=z[2i−2 mod k];
if i mod 4 is 2, permutation is to be y[i]=z[2i+1 mod k]; and
if i mod 4 is 3, permutation is to be y[i]=z[2i mod k];
to output a round output text Z=(z[0], . . . , z[k−1]).

6. A block encryption method, comprising:
dividing input data into a k-number of blocks;
performing Feistel permutation for an R-number of rounds; the Feistel permutation performing Feistel permutation, with two blocks as a set, using an encryption key generated from one round to another;
performing symmetrical type 2 branch coloring having a 4w-number, equal to one-half the number of division k of nodes, where w>1, in performed, in which transitioning from an evennumbered block to an odd-numbered block is represented by an arrow line of a first color and the transitioning from an odd-numbered block to an even-numbered block is represented by an arrow line of a second color, in such a manner that,
from a node 4j, transitioning of an arrow line of a first color is to a node 4j+1 and transitioning of an arrow line of a second color is to a node 4j+2; from a node 4j+1, transitioning of an arrow line of a first color is to a node 4j+2 and transitioning of an arrow line of a second color is to a node 4j+1,
from a node 4j+2, transitioning of an arrow line of a first color is to a node 4j+1 and transitioning of an arrow line of a second color is to a node 4j+3, and
from a node 4j+3, transitioning of an arrow line of a first color is to a node 4j+3 and transitioning of an arrow line of a second color is to a node 4j+1,
for each node (j=0, 1, . . . , w−1); where the node 4w is regarded to be a node 0; and
outputting that concatenates the as-permuted k-number of blocks to output the concatenated blocks, wherein
the number of division k into the blocks is a multiple of 8.

7. A non-transitory computer readable medium having thereon a program, the program having instruction which, when executed by a computer, causes the computer to perform a method comprising:
processing of dividing input data into a k-number of blocks;
processing of performing Feistel permutation for an R-number of rounds; the processing of Feistel permutation performing Feistel permutation, with two blocks as a set, using an encryption key generated from one round to another;
processing of block permutation performing block permutation equivalent to a binary de Bruijn graph with symmetric type 2 branch coloring, having a 2t-number, equal to one-half the number of division k, of nodes, where t>2, the de Bruijn graph indicating a transitioning from an even-numbered block to an oddnumbered block with an arrow line of a first color and indicating a transitioning from an oddnumbered block to an even-numbered block with an arrow line of a second color, using the following functions:

colorfunc$(u,v)=vt$ if $u1=ut$ and colorfunc$(u,v)=vt+1$ if $u1 \neq ut$ that decide on the colors of the arrow lines from a node u represented by a t-bit sequence $(u1, u2, \ldots, ut)$ to a node v represented by another t-bit sequence $(v1, v2, \ldots, vt)$; and processing that concatenates the as-permuted k-number of blocks to output the concatenated blocks.

8. The computer readable medium according to claim 7, wherein, the processing of block permutation inputs an intermediate text $Y=(y[0] \ldots, y[k-1])$, output from the Feistel permutation processing, and applies the permutation in which when a block number i from 0 to k−1 is less than k/2 and
if i mod 4 is 0, permutation is to be $y[i]=z[2i+1 \bmod k]$;
if i mod 4 is 1, permutation is to be $y[i]=z[2i \bmod k]$;
if i mod 4 is 2, permutation is to be $y[i]=z[2i+3 \bmod k]$; and
if i mod 4 is 3, permutation is to be $y[i]=z[2i-2 \bmod k]$; and
in which, if a block number i is not less than k/2 and
when i mod 4 is 0, permutation is to be $y[i]=z[2i+3 \bmod k]$;
if i mod 4 is 1, permutation is to be $y[i]=z[2i-2 \bmod k]$;
if i mod 4 is 2, permutation is to be $y[i]=z[2i+1 \bmod k]$; and
if i mod 4 is 3, permutation is to be $y[i]=z[2i \bmod k]$; to output a round output text $Z=(z[0], \ldots, z[k-1])$.

9. A non-transitory computer readable medium having thereon a program, the program having instruction which, when executed by a computer, causes the computer to perform a method comprising:

processing of dividing input data into a k-number of blocks;

processing of performing Feistel permutation for an R-number of rounds; the processing of Feistel permutation performing Feistel permutation, with two blocks as a set, using an encryption key generated from one round to another;

processing of block permutation equivalent to a directed graph of the number of orders of 2, with symmetrical type 2 branch coloring, having a 4w-number, equal to one-half the number of division k, of nodes, where w>1, in which transitioning from an even-numbered block to an odd-numbered block is represented by an arrow line of a first color and the transitioning from an odd-numbered block to an even-numbered block is represented by an arrow line of a second color, in such a manner that, from a node 4j, transitioning of an arrow line of a first color is to anode 4j+1 and transitioning of an arrow line of a second color is to a node 4j+2, from a node 4j+1, transitioning of an arrow line of a first color is to a node 4j+2 and transitioning of an arrow line of a second color is to a node 4j+1, from a node 4j+2, transitioning of an arrow line of a first color is to anode 4j+1 and transitioning of an arrow line of a second color is to a node 4j+3, and from a node 4j+3, transitioning of an arrow line of a first color is to a node 4j+3 and transitioning of an arrow line of a second color is to a node 4j+1, for each node (j=0, 1, . . . , w−1), where the node 4w is regarded to be a node 0; and processing that concatenates the as-permuted k-number of blocks to output the concatenated blocks, wherein the number of division to the blocks is a multiple of 8.

* * * * *